Oct. 23, 1923.  
E. E. FREDERICK  
DEMOUNTABLE RIM  
Filed Dec. 27, 1921  
1,471,595

Edwin E. Frederick INVENTOR

WITNESSES

BY

ATTORNEY

Patented Oct. 23, 1923.

1,471,595

UNITED STATES PATENT OFFICE.

EDWIN E. FREDERICK, OF WINTERHAVEN, FLORIDA.

DEMOUNTABLE RIM.

Application filed December 27, 1921. Serial No. 525,035.

*To all whom it may concern:*

Be it known that I, EDWIN E. FREDERICK, a citizen of the United States, residing at Winterhaven, in the county of Polk and State of Florida, have invented a new and useful Improvement in Demountable Rims, of which the following is a specification.

This invention has reference to demountable automobile rims, whereby to facilitate the application and removal of pneumatic tires to and from automobile wheels, and the invention comprises two telescoping or overlapping ring members, each with an outstanding tire-retaining flange to hold the tire in place, with one ring provided with a circular series of slots at that edge of the ring remote from its flange, and the other ring having a corresponding circular series of adjustable locking devices adapted to the slots, whereby the locking devices may be caused to engage in the slots and be rotated in and with relation to said slots to connect one ring to the other in a manner to prevent the rings from moving one on the other, and so disconnecting.

The pneumatic tire is slipped onto one ring, and the other ring is telescoped on to the first ring, and then the two rings are united by clips or lugs to fasten the telescoped rings together.

The pneumatic tire, when inflated, is held from spreading by the clips or lugs employed, which clips are of a nature to resist spreading apart of the connected rings, and the locking devices employed are prevented from escaping and releasing the tire under internal pressure, by the presence of the beads of the tire engaging the outstanding flanges, while the tire may be readily released, on deflation, in the same manner as occurs with solid channel rims, except that the channel rim is a two-part structure instead of being a solid, or one-piece, structure.

The invention will be best understood from a consideration of the following detailed description, taken in connection with the accompanying drawing, forming part of this specification with the understanding, however, that the invention is not confined to any strict conformity with the showing of the drawing, but may be changed and modified, so long as such changes and modifications mark no material departure from the salient features of the invention as expressed in the appended claims.

Figure 1:
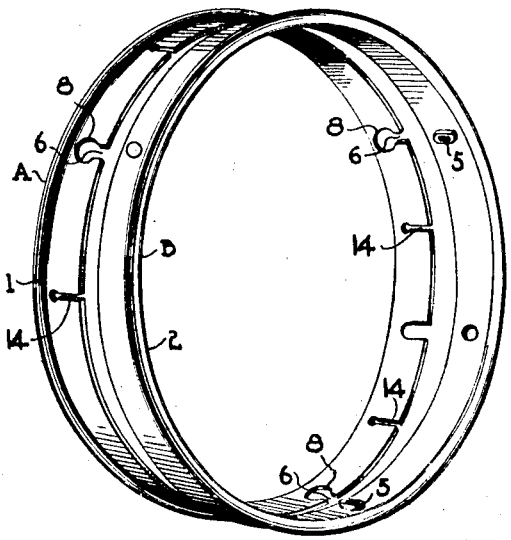
Figure 1 is a perspective view of the rings composing the rim, and shown in displayed relation.

Referring to the drawing, there is shown a rim composed of two ring members A and B, capable of telescoping one in the other, and, while in the main they are similar, they differ in some details. The ring A is a flat ring of sheet or cast metal, with a flange 1 about one edge, and the ring B is also a flat ring of sheet or cast metal of larger diameter so as to telescope the ring A, and is provided with a marginal flange 2 on the edge remote from the flange 1, so that when the two rings are telescoped together, they produce a tire-receiving channel to retain a pneumatic tire 3 with an inner tube 4, therein.

To hold the two rings A and B together, the ring B carries a circular series of swivel buttons 5, each having a flattened head of a width to enter a flattened mouth 6, leading into the enlarged interior of a locking slot 8, formed in the ring A, there being a circular series of such slots so that when the buttons 5 are in place and turned crosswise of the mouths 6, the ring A is held at regularly spaced points with respect to the ring B, wherefore neither ring is then capable of rotating with respect to the other ring, or of otherwise moving with relation thereto.

The inner ring A is provided with slots 14, extending inwardly from the inner edge of the ring partway across the ring and between the slots 8. This provides a certain degree of flexibility or resiliency for the inner edge of the ring so that it may be forced more readily against the inner side of the outer ring B by the locking devices hereinafter described.

In order to provide an equal distribution of locking devices between the two rings, there should be at least three pairs of coacting locking devices about the rim, and in larger wheels a greater number of such locking devices may be employed. In the drawing, three rotatable locking devices 5 and locking slots 8 are indicated, but this does not preclude the use of a greater number, where conditions warrant. When it is desired to mount a pneumatic tire on the rim, the tire casing 3 with the inner tube 4 therein, is placed about the ring B, which may be supported upon a floor or other flat surface, and the ring A is telescoped into the ring B, with the buttons 5 alined with the mouths 6, when the two rings A and B are moved together axially to an extent to admit the buttons 5 into the locking slots 8 and also permit them to be turned within these slots until they are crosswise of the mouths 6, thus preventing the escape of the buttons 5 from the slots 8, said buttons fitting closely in the slots, which are circular.

Figure 2:
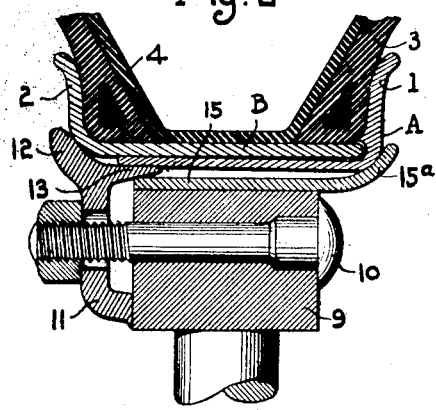
Figure 2 is a cross section of the ring in associated relation, showing a pneumatic tire in place and the rim mounted on a wheel felly.
Figure 3:
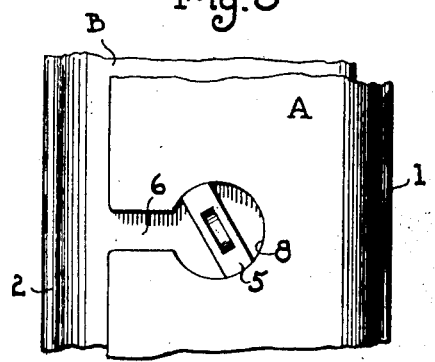
Figure 3 is a plan view of a small portion of the ring with the tire omitted.
Figure 4:
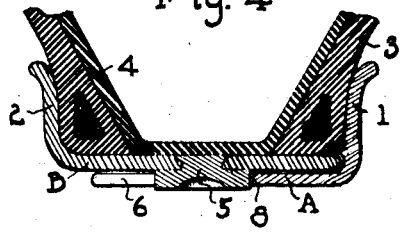
Figure 4 is a cross section of the assembled tire and rim, without the wheel felly.

Now the parts are in position to be applied to a wheel felly, indicated at 9, in Fig. 2, to which felly the connected rings A and B with the tire casing 3 in place, are united by means of a suitable number of bolts 10 and retaining clips or lugs 11, such as are customary in demountable rims. It will be noted that the width of the ring A is somewhat less than the width of ring B but is greater in width than the width of the felly 9, so that the free edge of the ring A extends beyond the side of the felly where the clips are provided. Each lug or clip 11 terminates in a clamp block 12 having a wedge-shaped tongue 13 engaging between the felly rim 15 and the free inner edge of the ring A at one side of a respective slot 14, whereby when the bolts are screwed into place, the tongue presses the free edge of the ring A against the ring B, so as to lock the two parts together, preventing squeaking, and overcoming any tendency of the rim slipping on the wheel. The clamp block is rounded outwardly to form a seat for the rounded corner of the ring B from which the flange 2 extends, while an outwardly curved edge 15ª of the felly rim 15 provides a seat for the rounded corner from which extends the flange 1 of the rim A. By this means the two rims are held firmly by the means employed to secure the rim to the wheel.

With the parts arranged as described, the pneumatic tire is sustained by the telescoping members A and B, held together against expansion under the action of the pumped up inner tube 4, so that they will not spread when the tire is inflated, and the ring members A and B also will not rotate or slip, one on the other, under the stresses they receive from movements of the wheel.

Figure 5:
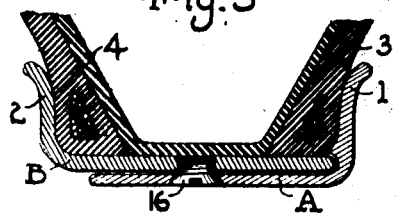
Figure 5 is a view similar to Figure 4 but illustrating a modification.

Instead of employing swivel buttons 5 to lock the two ring members A and B together against spreading apart, the arrangement of Fig. 5 may be used. In this case, illustrated in Figure 5, the ring member A is provided with a series of screws 16 countersunk into the member A and threaded into the member B, so that the screws will hold the two members against slipping, one on the other, and anchor them from displacement. It is to be understood that in Figure 5, the bolts 10, the felly 9, and the clamp blocks 12, are used like the arrangement of Fig. 2. It is also to be understood that instead of using a flat-head screw as shown, a square or hexagonal, or other shaped, screw, may be used.

The swivel buttons 5 may be mounted very slightly off-center with reference to the slots 8, so as to cramp therein and bind the two rings together.

The characteristic feature of this invention is the fact that the part or member of the rim upon which the tire fits is the full width of the rim, and this enables the other part or member to be placed in position with perfect ease; moreover, there is no break or joint in the rim and the part upon which the tire rests is perfectly smooth having only one hole for the valve stem and finally the wedge-shaped tongue of the retaining clip engages with the free edge of the ring A and holds it against the outside of the ring B. While two-part rims are not new, none of them possess the features mentioned.

What is claimed is:

1. A demountable rim comprising two solid ring members telescoping one on the other, each of said members being formed of a flat ring portion with an outstanding flange at one edge, one member resting upon the outer face of the other member and extending the full width of the rim and having a series of holes, one of which is for the valve stem, fastening means having heads filling and seated flush in said holes except the hole for the valve stem, and the other ring member having locking slots to be engaged by said fastening means, and also provided with a series of spaced slots extending inwardly from its free edge along the ring member and spaced from each other as well as the locking slots.

2. In combination with a felly, a demountable rim comprising two ring members telescoping one on the other, each of said members being formed of a flat ring portion with an outstanding flange at one edge, one member resting upon the outer face of the other member and extending the full width of the rim, and the said other member being of less width than the first mentioned member, said felly having a rim provided with a fixed flange extending about the outer edge of the ring member of less width, a retaining clip at one side of the felly provided with a tongue fitting between the felly rim and the free edge of the second-mentioned member, and an outwardly extending clamp block provided on the clip to engage the outer edge of the first-mentioned member.

3. In combination with a felly, a demountable rim comprising two ring members telescoping one on the other, each of said members being formed of a flat ring portion with an outstanding flange at one edge, the flange being joined with the flat portion by a rounded bend, one member resting upon the outer face of the other member and extending the full width of the rim, and said other member being of less width than the first mentioned member, but of greater width than the felly, means for connecting the members, said felly having a rim provided at one side with an outwardly curved edge engaging about the rounded bend of the second-mentioned member, and a retaining clip at the other side of the felly having a wedge-shaped tongue fitting between the felly rim and the free edge of the second-mentioned member and pressing against said free edge, and a clamp block provided with an outwardly extending seat to fit and engage the rounded corner of the first mentioned member.

4. In combination with a felly, a demountable rim comprising two ring members telescoping one on the other, each of said members being formed of a flat ring portion with an outstanding flange at one edge, one member resting upon the outer face of the other member and extending the full width of the rim, and said other member being of less width than the first-mentioned member, said felly having a rim provided with an outstanding edge at one side of the felly engaging the outer edge of the member of less width, a retaining clip provided at the side of the felly opposite said outstanding edge and provided with a wedge-shaped tongue fitting between the felly rim and the free edge of the second-mentioned member, which free edge projects beyond that side of the felly carrying the retaining clip, and said clip having a clamp block engaging with the first-mentioned member at the outer edge thereof.

5. In combination with a felly, a rim comprising two axially separable telescoping rings with flat meeting faces and outstanding flanges at the opposite edges, means for connecting the rings to hold them from relative movement, a slot provided in the edge of the inner ring, and means for connecting the rim to the felly, said means being provided with a wedge-shaped tongue to engage between the felly rim and the free edge of said inner ring adjacent said slot to hold the inner ring against the outer ring and prevent the rim from slipping on the felly.

In testimony that I claim the foregoing as my own, I have hereto affixed my signature.

EDWIN E. FREDERICK.